United States Patent Office 2,793,205
Patented May 21, 1957

2,793,205

DISAZO-DYESTUFFS

Henri Riat, Arlesheim, Switzerland, assignor to Ciba Limited, Basel, Switzerland, a Swiss firm No Drawing. Application November 16, 1953,
Serial No. 392,523

Claims priority, application Switzerland
November 28, 1952

7 Claims. (Cl. 260—182)

This invention provides new disazo-dyestuffs, which, like the dyestuff of the formula (1)
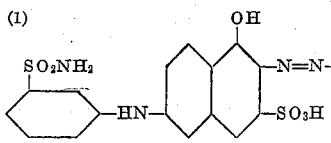
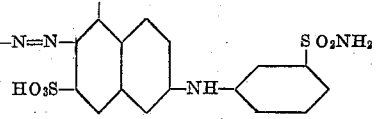

correspond to the general formula (2)
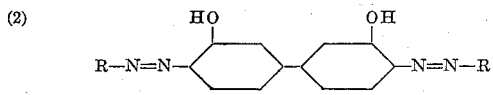

in which R represents the radical of a 1-hydroxynaphthalene-3-sulfonic acid bound in the 2-position to the azo linkage and which contains an aryl-amino-sulfonic acid amide group in a β-position. The invention also provides complex metal compounds of the dyestuffs of the above general formula.

The invention also provides a process for making the dyestuffs of the above general formula, wherein tetrazotized 3:3'-dihydroxy-4:4'-diaminodiphenyl is coupled on both sides with a 1-hydroxynaphthalene-3-sulfonic acid, which contains in a β-position of the 6-membered ring not substituted by the hydroxyl and sulfonic acid groups an aminoaryl-sulfonic acid amide group. The invention also includes the manufacture of metalliferous disazodyestuffs by treating the above disazo-dyestuffs with an agent yielding metal.

The azo components used in the process of this invention can be designated in general as 2-arylamino-5-hydroxynaphthalene-7-sulfonic acid-$x'$-(for example, 3'- or 4'-)-sulfonic acid amides or 2-arylamino-8-hydroxynaphthalene-6-sulfonic acid-$x'$-sulfonic acid amides.

Of special interest are 2-phenylamino-hydroxynaphthalene sulfonic acids of the above kind, in which the sulfonic acid amide group is present, for example, in the 3'- or 4'-position, and which sulfonic acid amide group may be substituted in a suitable manner by one or two alkyl radicals of low molecular weight or hydroxyalkyl groups of low molecular weight, such as hydroxyethyl groups, or may be a simple —$SO_2NH_2$— group. The 2-phenylamino-5-hydroxynaphthalene - 7 - sulfonic acid-sulfonic acid amides, for example, 2-phenylamino-5-hydroxynaphthalene-7-sulfonic acid-3'-sulfonic acid amide, are especially valuable on account of the purity of the tints, good absorption capacity and good properties of fastness of the dyestuffs obtained therewith. There are also suitable as azo-components 2-phenylamino-5-hydroxynaphthalene-7-sulfonic acid-3'- or -4'-sulfonic acid amides, which contain substituents in the phenyl radical, for example, 2-(4'-methyl)-phenylamino-5-hydroxynaphthalene-7-sulfonic acid-3'-sulfonic acid amide. There also come into consideration among the 2-phenylamino-8-hydroxynaphthalene-6-sulfonic acid-3'- or 4'-sulfonic acid amides those which contain an unsubstituted sulfonic acid amide group, for example, 2-phenylamino-8-hydroxynaphthalene-6-sulfonic acid-3'-sulfonic acid amide, and also those which contain an alkylated or hydroxyalkylated sulfonic acid amide group, and also those in which the phenyl nucleus contains a substituent, for example, a lower alkyl group.

The arylamino-hydroxynaphthalene-sulfonic acid sulfonic acid amides can be obtained by methods in themselves known from 2-amino-5-hydroxynaphthalene-7-sulfonic acid or 2-amino-8-hydroxynaphthalene-6-sulfonic acid and amino-arylsulfonic acid amides by reaction with sulfites, by the so-called Bucherer reaction. Instead of amino-hydroxynaphthalene sulfonic acids there may be used the corresponding dihydroxy-sulfonic acids as starting materials for making the azo components used in the present process.

The coupling of the tetrazo-compounds with the arylamino-hydroxynaphthalene sulfonic acid amides is advantageously carried out in an alkaline medium.

In order to facilitate the coupling of tetrazotized 3:3'-dihydroxy-4:4'-diaminodiphenyl, which is often rather sluggish especially in the second step, it has been found advantageous in many cases to work in a medium containing an alkali metal hydroxide or alkaline earth metal hydroxide and/or with the addition of a suitable solvent such as alcohol, acetone, dioxane, dimethyl-formamide, mono-, di- or tri-ethanolamine, pyridine or a picoline.

As agents yielding metal there come into consideration, for example, agents yielding nickel and especially agents yielding copper. The treatment with the agent yielding metal may be carried out by methods in themselves known, for example, with copper sulfate in the presence of sodium acetate.

The metal-free dyestuffs of the invention which, in the form of their alkali salts, are soluble in water are suitable for dyeing or printing a very wide variety of materials, especially cellulose-containing materials such as cotton, linen, and artificial silk or staple fibers of regenerated cellulose. Especially valuable are dyeings and prints, which have been treated with an agent yielding metal, especially an agent yielding copper, this treatment being carried out on the fiber, in the dyebath or in part on the fiber and in part in the dyebath, for example as described in U. S. Patent No. 2,148,659.

Valuable dyeings can also be produced by using the process in which a dyeing produced with the metal-free dyestuff is after-treated with an aqueous solution which contains, on the one hand, a basic condensation product of formaldehyde with a compound which contains at least once the atomic grouping

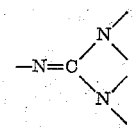

or with a compound, for example, cyanamide, which is easily convertible into a compound containing such atomic grouping, and contains, on the other, a water-soluble copper compound, especially a complex copper compound.

A further advantageous method of dyeing with the metal-free dyestuffs consists in using a dyebath prepared with the dyestuff, a hydroxyalkylamine, an alkali-resistant agent yielding metal and advantageously a compound which contains the anion of a phosphoric acid. Methods of this kind are described in U. S. patent applications Ser. No. 319,773, filed November 10, 1952, now U. S. Patent No. 2,749,207, and Ser. No. 319,774, filed November 10, 1952, and now abandoned.

The metalliferous dyestuffs of this invention are as a rule too sparingly soluble for use by the customary direct dyeing processes. However, they are very well suited for dyeing processes employing neutral to alkaline dyebaths, for the preparation of which there is used a sparingly soluble complex nickel or cobalt compound of a direct dyeing dyestuff, a suitable aliphatic amine which contains at least one amino group separated from a hydroxyl group by two carbon atoms (for example, 1:2 - di- ($\beta$ - hydroxyethylamino)ethane) and a phosphorus compound derived from a phosphoric acid of the constitution $H_{m+2}P_mO_{3m+1}$, in which $m$ represents a whole number. Such dyeing processes are also described in the applications mentioned above.

Dyeings which contain metal bound in complex union, especially copper, and have been produced with the dyestuffs of this invention, are distinguished by their very good properties of fastness, especially by their good properties of wet fastness.

The following examples illustrate the invention, the parts and percentages being by weight unless otherwise stated and the relationship of parts by weight to parts by volume being the same as that of the kilogram to the liter:

Example 1

A diazo compound prepared in the usual manner from 21.6 parts of 3:3'-dihydroxy-4:4'-diaminodiphenyl, neutralized and filtered off, is introduced into a mixture of 80 parts of 2 - phenylamino - 5 - hydroxynapthalene - 7 - sulfonic acid - 3' - sulfonic acid amide, 300 parts of a calcium hydroxide suspension of about 10 percent strength and 60 parts of pyridine, and the whole is stirred at 5–10° C. until the coupling is complete. The coupling mixture is then slowly heated to 50–60° C., diluted with 2000 parts of warm water, and the solution is mixed with 50 parts of anhydrous sodium carbonate and filtered to remove precipitated calcium carbonate. The dyestuff of the formula (1) is precipitated from the filtrate by neutralization with dilute hydrochloric acid and the addition of sodium chloride, and filtered off and dried. It is a dark colored powder which dissolves in water with a blue coloration and dyes cotton by the single bath or 2-bath after-coppering process greenish blue tints which are very fast to light and washing.

By using, instead of 2 - phenylamino - 5 - hydroxynaphthalene - 7 - sulfonic acid - 3' - sulfonic acid amide, 2 - phenylamino - 5 - hydroxynaphthalene - 7 - sulfonic acid - 4' - sulfonic acid amide or 2 - (4' - methylphenyl)- amino - 5 - hydroxynaphthalene - 7 - sulfonic acid - 3'- sulfonic acid amide or 2 - phenylamino - 5 - hydroxynaphthalene - 7 - sulfonic acid - 3' - sulfonic acid methyl amide or 2 - phenylamino - 5 - hydroxynaphthalene - 7 - sulfonic acid - 3' - sulfonic acid $\beta$ - hydroxyethylamide, there is obtained a dyestuff having similar properties.

Finally, by replacing the 2 - phenyl - amino - 5 - hydroxynaphthalene - 7 - sulfonic acid - 3' - sulfonic acid amide, by 2 - phenylamino - 8 - hydroxynaphthalene - 6- sulfonic acid - 3' - sulfonic acid amide, there is obtained a dyestuff which dyes cotton by the single bath or 2 - bath after-coppering process grey-blue tints.

The 2 - phenylamino - 5 - hydroxynaphthalene - 7 - sulfonic acid - 3' - sulfonic acid amide may be prepared in the following manner:

A mixture of 240 parts of 2 - amino - 5 - hydroxynaphthalene - 7 - sulfonic acid, 200 parts of aminobenzene - 3- sulfonic acid amide, 800 parts of a sodium bisulfite solution of 40 percent strength and 100 parts of a sodium hydroxide solution of 30 percent strength is boiled for 15 hours under reflux. Upon cooling the mixture to about 0–10° C. the reaction product crystallizes out. The product is filtered off and washed with a saturated solution of sodium chloride. It is a grey-white substance, which is easily soluble in water. If desired it may be dried.

Instead of 2 - amino - 5 - hydroxynaphthalene - 7 - sulfonic acid, 2:5 - dihydroxynaphthalene sulfonic acid may be used for the reaction with aminobenzene - 3 - sulfonic acid amide.

The other azo components mentioned above can be prepared in an analogous manner.

Example 2

100 parts of cotton are entered into a dyebath at 50° C., which contains in 4000 parts of water, 0.4 part of the dyestuff obtainable as described in the first paragraph of Example 1 and 2 parts of anhydrous sodium carbonate. The temperature is raised in the course of 20 minutes to 90–95° C., 40 parts of crystalline sodium sulfate are added, and dyeing is continued for 30 minutes at 90–100° C. The bath is then allowed to cool to about 70° C., 3 parts of complex sodium copper tartrate of approximately neutral reaction are added. Coppering is carried on for ½ hour at 80° C., and then the dyed material is rinsed with cold water. If desired, the dyeing may be soaped by after-treatment with a solution which contains 5 parts of soap and 2 parts of anhydrous sodium carbonate in 1000 parts by volume of water. There is obtained a greenish blue dyeing of good fastness to washing and light.

What is claimed is:

1. A disazo-dyestuff of the formula

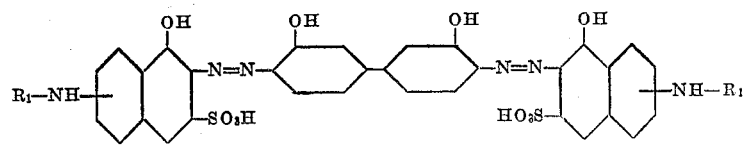

in which $R_1$ represents a benzene radical containing an —$SO_2NH_2$ group and wherein each —NH— group stands in a $\beta$-position of the naphthalene nucleus.

2. A disazo-dyestuff of the formula

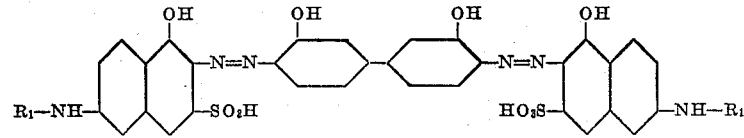

in which $R_1$ represents a benzene radical containing an —$SO_2NH_2$ group.

3. A disazo-dyestuff of the formula

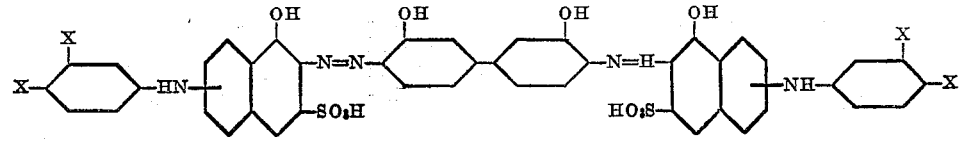

in which each —NH— group stands in a β-position of the naphthalene nucleus and one of each of the two X's bound to the same benzene nucleus represents a hydrogen atom and the other X an —SO₂NH₂ group.

4. A disazo-dyestuff of the formula

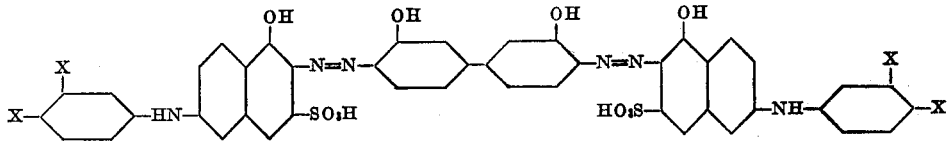

in which one of each of the two X's bound to the same benzene nucleus represents a hydrogen atom and the other X an —SO₂NH₂ group.

5. The disazo-dyestuff of the formula

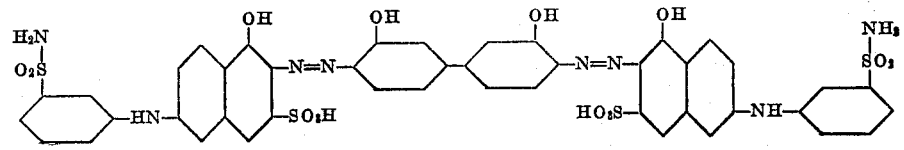

6. The disazo-dyestuff of the formula

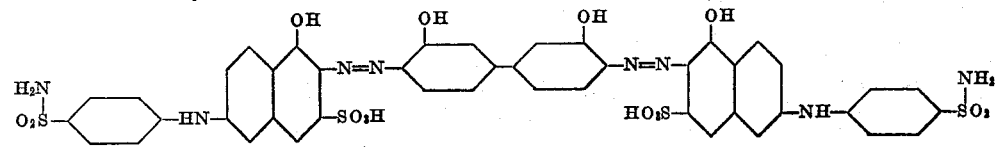

7. The disazo-dyestuff of the formula

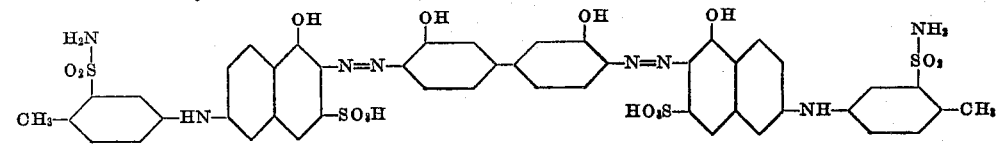

References Cited in the file of this patent
UNITED STATES PATENTS

| | | |
|---|---|---|
| 2,426,977 | Straub et al. | Sept. 9, 1947 |
| 2,427,537 | Straub et al. | Sept. 16, 1947 |
| 2,439,153 | Straub et al. | Apr. 6, 1948 |
| 2,476,259 | Moyer et al. | July 12, 1949 |
| 2,630,431 | Trepagnier | Mar. 3, 1953 |